US012587645B2

(12) United States Patent
Kossentini et al.

(10) Patent No.: US 12,587,645 B2
(45) Date of Patent: Mar. 24, 2026

(54) COMPLEXITY AWARE ENCODING

(71) Applicant: Intel Corporation, Santa Clara, CA (US)

(72) Inventors: Faouzi Kossentini, Vancouver (CA); Chekib Nouira, Mission (CA)

(73) Assignee: Intel Corporation, Santa Clara, CA (US)

( * ) Notice: Subject to any disclaimer, the term of this patent is extended or adjusted under 35 U.S.C. 154(b) by 665 days.

(21) Appl. No.: 17/955,443

(22) Filed: Sep. 28, 2022

(65) Prior Publication Data

US 2023/0027742 A1 Jan. 26, 2023

Related U.S. Application Data

(60) Provisional application No. 63/352,836, filed on Jun. 16, 2022.

(51) Int. Cl.
| | |
|---|---|
| *H04N 19/124* | (2014.01) |
| *H04N 19/146* | (2014.01) |
| *H04N 19/154* | (2014.01) |

(52) U.S. Cl.
CPC ......... *H04N 19/124* (2014.11); *H04N 19/146* (2014.11); *H04N 19/154* (2014.11)

(58) Field of Classification Search
CPC ..................................................... H04N 19/124

USPC ..................................................... 375/240.03
See application file for complete search history.

(56) References Cited

U.S. PATENT DOCUMENTS

| | | | | |
|---|---|---|---|---|
| 2005/0091041 A1* | 4/2005 | Ramo | .................... | G10L 19/24 |
| | | | | 704/E19.044 |
| 2021/0335378 A1* | 10/2021 | Liang | ...................... | G10L 19/24 |
| 2022/0256169 A1* | 8/2022 | Siddaramanna | ....... | G06N 3/045 |
| 2023/0377338 A1* | 11/2023 | Chaurasia | .............. | G06V 10/26 |

* cited by examiner

*Primary Examiner* — Yulin Sun
(74) *Attorney, Agent, or Firm* — Hanley, Flight & Zimmerman, LLC

(57) ABSTRACT

This disclosure describes systems, methods, and devices related to complexity aware encoding. A device may generate a list of encodes based on pairs of resolution and quantization parameters (QP) pairs associated with one or more video segments received from a source. The device may generate an estimated bit rate associated with the one or more video segments based on an analysis of the one or more video segments. The device may determine distortion values associated with the one or more video segments. The device may apply a weighting mechanism to the distortion values using the estimated bit rate. The device may select a subset of encodes based on the weighting mechanism. The device may perform the subset of encodes on the one or more video segments for transmission.

20 Claims, 6 Drawing Sheets

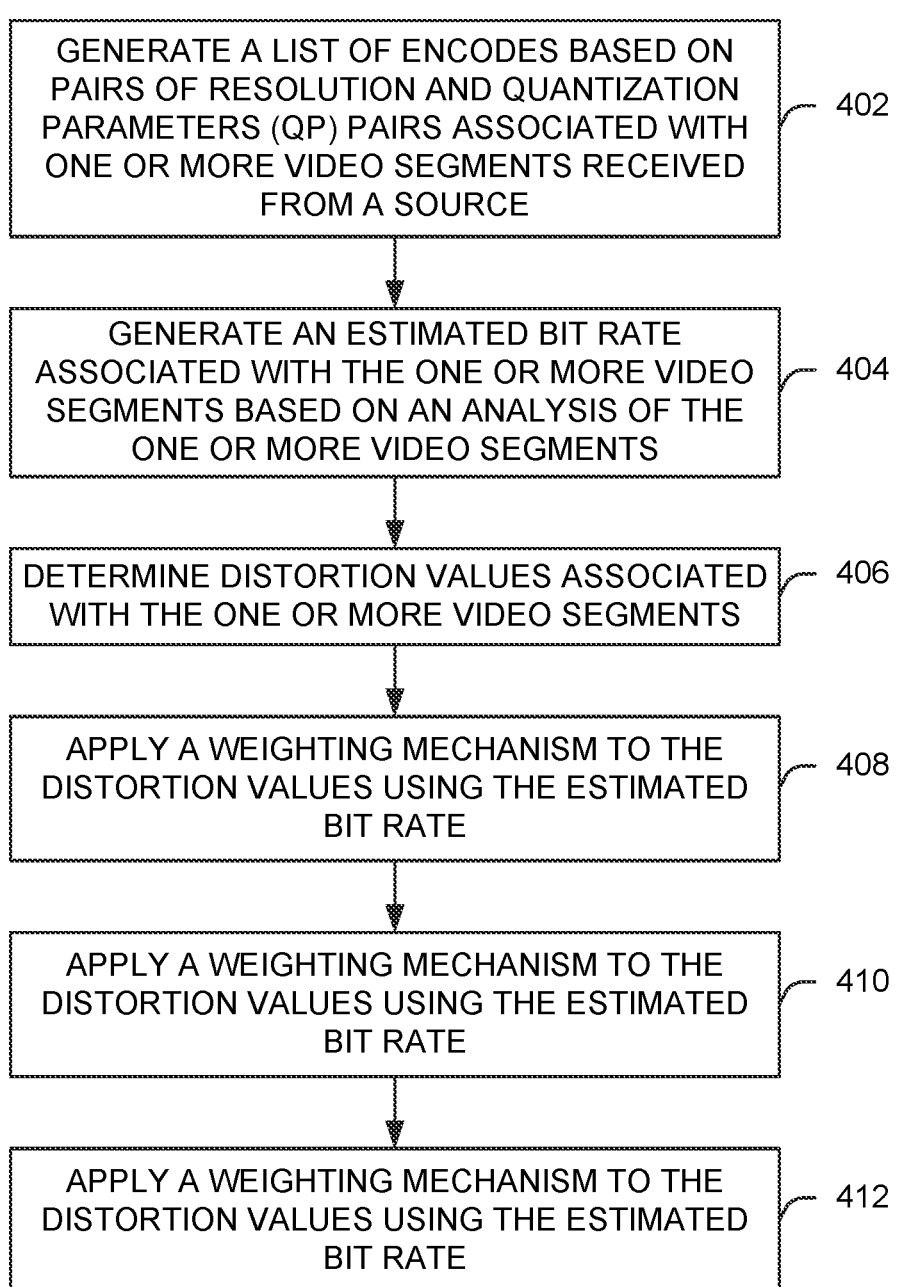

400

GENERATE A LIST OF ENCODES BASED ON PAIRS OF RESOLUTION AND QUANTIZATION PARAMETERS (QP) PAIRS ASSOCIATED WITH ONE OR MORE VIDEO SEGMENTS RECEIVED FROM A SOURCE — 402

GENERATE AN ESTIMATED BIT RATE ASSOCIATED WITH THE ONE OR MORE VIDEO SEGMENTS BASED ON AN ANALYSIS OF THE ONE OR MORE VIDEO SEGMENTS — 404

DETERMINE DISTORTION VALUES ASSOCIATED WITH THE ONE OR MORE VIDEO SEGMENTS — 406

APPLY A WEIGHTING MECHANISM TO THE DISTORTION VALUES USING THE ESTIMATED BIT RATE — 408

APPLY A WEIGHTING MECHANISM TO THE DISTORTION VALUES USING THE ESTIMATED BIT RATE — 410

APPLY A WEIGHTING MECHANISM TO THE DISTORTION VALUES USING THE ESTIMATED BIT RATE — 412

FIG. 4

COMPLEXITY AWARE ENCODING

CROSS-REFERENCE TO RELATED APPLICATION(S)

This application claims the benefit of U.S. Provisional Application No. 63/352,836, filed Jun. 16, 2022, the disclosure of which is incorporated herein by reference as if set forth in full.

TECHNICAL FIELD

This disclosure generally relates to systems and methods for wireless communications and, more particularly, to complexity aware encoding.

BACKGROUND

Video coding can be a lossy process that sometimes results in reduced quality when compared to original source video. Video coding standards are being developed to improve video quality.

BRIEF DESCRIPTION OF THE DRAWINGS

FIG. 4 illustrates a flow diagram of a process for an illustrative complexity aware encoding system, in accordance with one or more example embodiments of the present disclosure.

Figure 1:
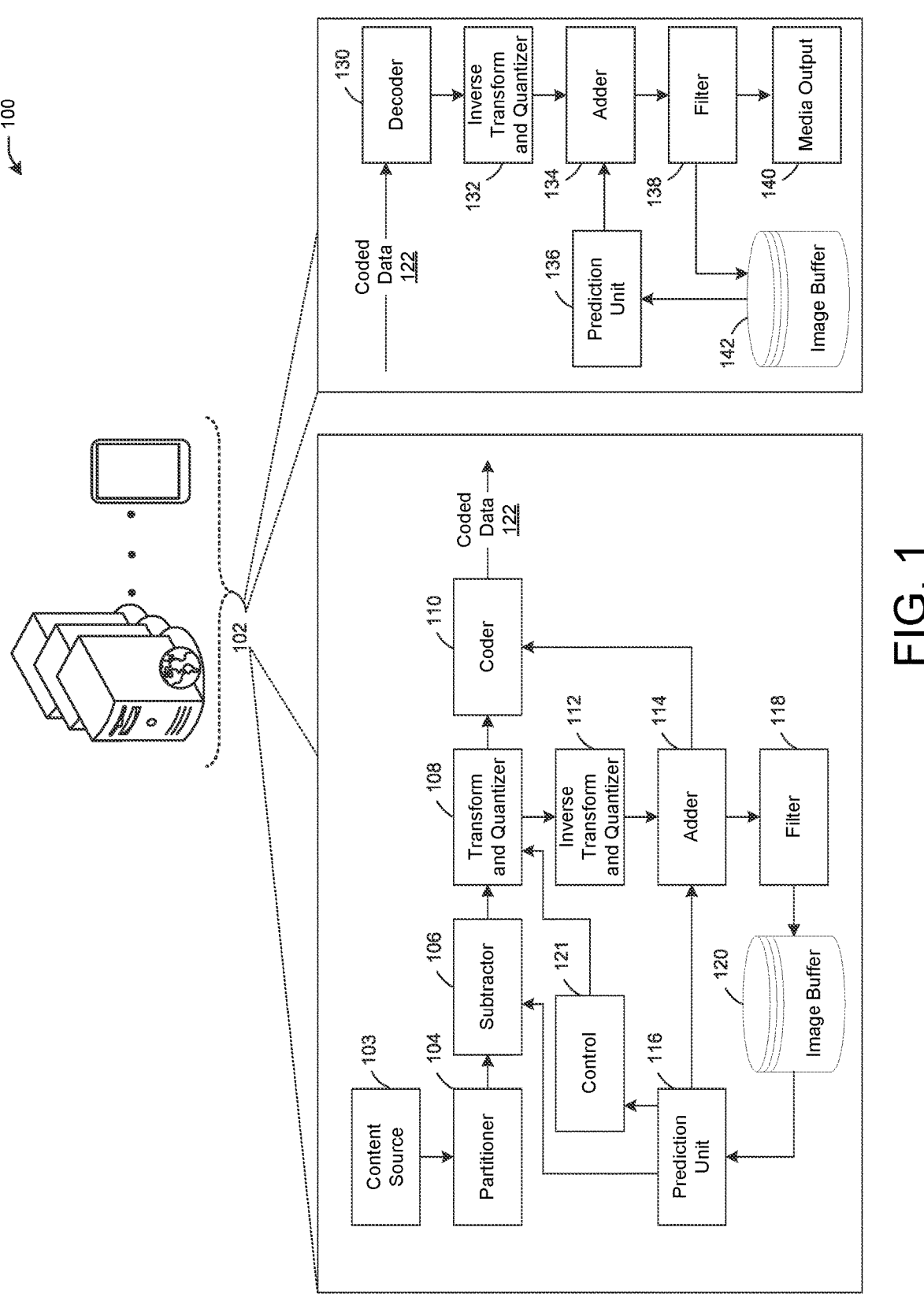
FIG. 1 depicts an example system illustrating components of encoding and decoding devices, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Encoding is used in many video streaming applications to achieve a seamless quality of service when the network conditions vary frequently during the streaming session. The service adapts to the user's bandwidth conditions by streaming videos with different rate/quality levels. To accomplish this, the input video is downsampled as necessary to generate multiple-resolution videos. Each video is then encoded using multiple constant rate factor (CRF)/quantization parameter (QP) values. All of the (rate, distortion) results are then input to a convex-hull-optimized algorithm to determine the (rate, distortion) points that are on the outer layer of the convex hull i.e., all the points that maximize the quality at any given bit rate. The convex-hull outputs the (rate, distortion) points that achieve the largest (distortion deviation)/(rate deviation) slopes for the target rate levels.

Conventional convex-hull-optimized encoding can be very computationally demanding, since each video clip/shot is encoded many times, with one encode for each (resolution, QP) pair. For example, to generate the best tradeoffs for a typical streaming service, it may be needed to test/consider as many as 8 resolutions and as many as 11 different QP values, which would require 11×8=88 encodings. To address the potentially large computational burden, a two-pass convex-hull algorithm was proposed, where a fast first-pass encoder is used to perform all (resolution, QP) encodings, with the resulting (rate, distortion) values to be used by the convex hull algorithm to select the best (rate, distortions) pairs and corresponding (resolution, QP) values, and then a second-pass higher-quality/slower encoder is used to perform the encodings for only the selected (resolution, QP) pairs, generating the final bit streams for the streaming service.

However, even the more efficient two-pass convex-hull is not sufficiently efficient, as it does not consider the processor cycle costs of the different second-pass encodings. For example, encoding a 1080p clip/shot at native resolution and at QP=20 would take, on average, more than 20× the number of cycles needed by encoding the same clip/shot at 480p resolution and QP=55. But the convex-hull algorithm, being dependent on only the rate-distortion tradeoffs could select the (1080p, 20) pair simply because its rate-distortion tradeoffs are better than those of the (480p, 55) pair. In order to design a system that minimizes the total number of cycles for a given level of quality, the convex-hull algorithm will need to become cycles-cost-aware, i.e., it will need to be optimized to achieve the best-possible rate-distortion-cycles-cost tradeoffs. This would help reduce substantially the number of second-pass encoding cycles; however, given the potentially-complex three-dimensional optimization problem, several simple techniques will be presented that could still achieve good overall tradeoffs between quality and number of cycles.

Some streaming service providers limit the maximum resolution to 720p or even 540p, and the maximum bit rate to 8-10 Mbps, in an effort to reduce the number of convex-hull-optimized second-pass encoding cycles. The main disadvantage of the aforementioned solutions is that they would restrict the streaming service provider from delivering high-quality bit streams to the high-paying users. This is like removing business-class/first-class seats from airplanes for Airlines, meaning that the service providers would be deprived of high-margin income.

Example embodiments of the present disclosure relate to systems, methods, and devices for complexity aware encoding.

In one embodiment, a complexity aware encoding system may take advantage of the different resolution, QP, and content characteristics of different video shots (or segments, or clips). The number of encoding cycles of a higher-resolution version of a video shot is usually higher than that of a lower-resolution version of the same shot. The same applies to lower QPs, where the number of encoding cycles would usually be larger than that of a higher-QP encode. Moreover, for a given (resolution, QP) pair, a video shot with higher content complexity would be less predictable, requiring a larger number of non-zero coefficients, or equivalently, a higher bit rate, which would in turn require a larger number of encoding cycles. Therefore, to optimize the convex-hull algorithm towards the best-possible tradeoffs between quality and number of cycles, a complexity aware encoding system may employ a weighted measure between rate, distortion, and a number of cycles, or indirectly, modulate/bias/offset the distortion levels of the (rate, distortion) points, based on resolution, QP, and content complexity (though bit rate), of each video shot. More specifically, prior to applying the convex-hull algorithm, a complexity aware encoding system may apply a negative distortion bias value to favor a lower resolution, a higher QP value, and a lower bit rate. An effective algorithm may be developed that would generate all bias/offset values that, together, would yield the best-possible tradeoffs between quality and a total number of processor cycles. This algorithm will be described later in the patent application.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

FIG. 1 depicts an example system 100 illustrating components of encoding and decoding devices, according to some example embodiments of the present disclosure.

Referring to FIG. 1, the system 100 may include devices 102 having encoder and/or decoder components. As shown, the devices 102 may include a content source 103 that provides video and/or audio content (e.g., a camera or other image capture device, stored images/video, etc.). The content source 103 may provide media (e.g., video and/or audio) to a partitioner 104, which may prepare frames of the content for encoding. A subtractor 106 may generate a residual as explained further herein. A transform and quantizer 108 may generate and quantize transform units to facilitate encoding by a coder 110 (e.g., entropy coder). Transform and quantized data may be inversely transformed and inversely quantized by an inverse transform and quantizer 112. An adder 114 may compare the inversely transformed and inversely quantized data to a prediction block generated by a prediction unit 116, resulting in reconstructed frames. A filter 118 (e.g., in-loop filter for resizing/cropping, color conversion, de-interlacing, composition/blending, etc.) may revise the reconstructed frames from the adder 114, and may store the reconstructed frames in an image buffer 120 for use by the prediction unit 116. A control 121 may manage many encoding aspects (e.g., parameters) including at least the setting of a quantization parameter (QP) but could also include setting bitrate, rate distortion or scene characteristics, prediction and/or transform partition or block sizes, available prediction mode types, and best mode selection parameters, for example, based at least partly on data from the prediction unit 116. Using the encoding aspects, the transform and quantizer 108 may generate and quantize transform units to facilitate encoding by the coder 110, which may generate coded data 122 that may be transmitted (e.g., an encoded bitstream).

Still referring to FIG. 1, the devices 102 may receive coded data (e.g., the coded data 122) in a bitstream, and a decoder 130 may decode the coded data, extracting quantized residual coefficients and context data. An inverse transform and quantizer 132 may reconstruct pixel data based on the quantized residual coefficients and context data. An adder 134 may add the residual pixel data to a predicted block generated by a prediction unit 136. A filter 138 may filter the resulting data from the adder 134. The filtered data may be output by a media output 140, and also may be stored as reconstructed frames in an image buffer 142 for use by the prediction unit 136.

Referring to FIG. 1, the system 100 performs the methods of intra prediction disclosed herein, and is arranged to perform at least one or more of the implementations described herein including intra block copying. In various implementations, the system 100 may be configured to undertake video coding and/or implement video codecs according to one or more standards. Further, in various forms, video coding system 100 may be implemented as part of an image processor, video processor, and/or media processor and undertakes inter-prediction, intra-prediction, predictive coding, and residual prediction. In various implementations, system 500 may undertake video compression and decompression and/or implement video codecs according to one or more standards or specifications, such as, for example, H.264 (Advanced Video Coding, or AVC), VP8, H.265 (High Efficiency Video Coding or HEVC) and SCC extensions thereof, VP9, Alliance Open Media Version 1 (AV1), H.266 (Versatile Video Coding, or VVC), DASH (Dynamic Adaptive Streaming over HTTP), and others. Although system 100 and/or other systems, schemes or processes may be described herein, the present disclosure is not necessarily always limited to any particular video coding standard or specification or extensions thereof.

As used herein, the term "coder" may refer to an encoder and/or a decoder. Similarly, as used herein, the term "coding" may refer to encoding via an encoder and/or decoding via a decoder. A coder, encoder, or decoder may have components of both an encoder and decoder. An encoder may have a decoder loop as described below.

For example, the system 100 may be an encoder where current video information in the form of data related to a sequence of video frames may be received to be compressed. By one form, a video sequence (e.g., from the content source 103) is formed of input frames of synthetic screen content such as from, or for, business applications such as word processors, power points, or spread sheets, computers, video games, virtual reality images, and so forth. By other forms, the images may be formed of a combination of synthetic screen content and natural camera captured images. By yet another form, the video sequence only may be natural camera captured video. The partitioner 104 may partition each frame into smaller more manageable units, and then compare the frames to compute a prediction. If a difference or residual is determined between an original block and prediction, that resulting residual is transformed and quantized, and then entropy encoded and transmitted in a bitstream, along with reconstructed frames, out to decoders or storage. To perform these operations, the system 100 may receive an input frame from the content source 103. The input frames may be frames sufficiently pre-processed for encoding.

The system 100 also may manage many encoding aspects including at least the setting of a quantization parameter (QP) but could also include setting bitrate, rate distortion or scene characteristics, prediction and/or transform partition or block sizes, available prediction mode types, and best mode selection parameters to name a few examples.

The output of the transform and quantizer 308 may be provided to the inverse transform and quantizer 112 to generate the same reference or reconstructed blocks, frames, or other units as would be generated at a decoder such as decoder 130. Thus, the prediction unit 116 may use the inverse transform and quantizer 112, adder 114, and filter 118 to reconstruct the frames.

The prediction unit 116 may perform inter-prediction including motion estimation and motion compensation, intra-prediction according to the description herein, and/or a combined inter-intra prediction. The prediction unit 116 may select the best prediction mode (including intra-modes) for a particular block, typically based on bit-cost and other factors. The prediction unit 116 may select an intra-prediction and/or inter-prediction mode when multiple such modes of each may be available. The prediction output of the prediction unit 116 in the form of a prediction block may be provided both to the subtractor 106 to generate a residual, and in the decoding loop to the adder 114 to add the prediction to the reconstructed residual from the inverse transform to reconstruct a frame.

The partitioner 104 or other initial units not shown may place frames in order for encoding and assign classifications to the frames, such as I-frame, B-frame, P-frame and so forth, where I-frames are intra-predicted. Otherwise, frames may be divided into slices (such as an I-slice) where each slice may be predicted differently. Thus, for HEVC or AV1 coding of an entire I-frame or I-slice, spatial or intra-prediction is used, and in one form, only from data in the frame itself.

In various implementations, the prediction unit 116 may perform an intra block copy (IBC) prediction mode and a non-IBC mode operates any other available intra-prediction mode such as neighbor horizontal, diagonal, or direct coding (DC) prediction mode, palette mode, directional or angle modes, and any other available intra-prediction mode. Other video coding standards, such as HEVC or VP9 may have different sub-block dimensions but still may use the IBC search disclosed herein. It should be noted, however, that the foregoing are only example partition sizes and shapes, the present disclosure not being limited to any particular partition and partition shapes and/or sizes unless such a limit is mentioned or the context suggests such a limit, such as with the optional maximum efficiency size as mentioned. It should be noted that multiple alternative partitions may be provided as prediction candidates for the same image area as described below.

The prediction unit 116 may select previously decoded reference blocks. Then comparisons may be performed to determine if any of the reference blocks match a current block being reconstructed. This may involve hash matching, SAD search, or other comparison of image data, and so forth. Once a match is found with a reference block, the prediction unit 116 may use the image data of the one or more matching reference blocks to select a prediction mode. By one form, previously reconstructed image data of the reference block is provided as the prediction, but alternatively, the original pixel image data of the reference block could be provided as the prediction instead. Either choice may be used regardless of the type of image data that was used to match the blocks.

The predicted block then may be subtracted at subtractor 106 from the current block of original image data, and the resulting residual may be partitioned into one or more transform blocks (TUs) so that the transform and quantizer

108 can transform the divided residual data into transform coefficients using discrete cosine transform (DCT) for example. Using the quantization parameter (QP) set by the system 100, the transform and quantizer 108 then uses lossy resampling or quantization on the coefficients. The frames and residuals along with supporting or context data block size and intra displacement vectors and so forth may be entropy encoded by the coder 110 and transmitted to decoders.

In one or more embodiments, a system 100 may have, or may be, a decoder, and may receive coded video data in the form of a bitstream and that has the image data (chroma and luma pixel values) and as well as context data including residuals in the form of quantized transform coefficients and the identity of reference blocks including at least the size of the reference blocks, for example. The context also may include prediction modes for individual blocks, other partitions such as slices, inter-prediction motion vectors, partitions, quantization parameters, filter information, and so forth. The system 100 may process the bitstream with an entropy decoder 130 to extract the quantized residual coefficients as well as the context data. The system 100 then may use the inverse transform and quantizer 132 to reconstruct the residual pixel data.

The system 100 then may use an adder 134 (along with assemblers not shown) to add the residual to a predicted block. The system 100 also may decode the resulting data using a decoding technique employed depending on the coding mode indicated in syntax of the bitstream, and either a first path including a prediction unit 136 or a second path that includes a filter 138. The prediction unit 136 performs intra-prediction by using reference block sizes and the intra displacement or motion vectors extracted from the bitstream, and previously established at the encoder. The prediction unit 136 may utilize reconstructed frames as well as inter-prediction motion vectors from the bitstream to reconstruct a predicted block. The prediction unit 136 may set the correct prediction mode for each block, where the prediction mode may be extracted and decompressed from the compressed bitstream.

In one or more embodiments, the coded data 122 may include both video and audio data. In this manner, the system 100 may encode and decode both audio and video.

It is understood that the above descriptions are for purposes of illustration and are not meant to be limiting.

Figure 2A:
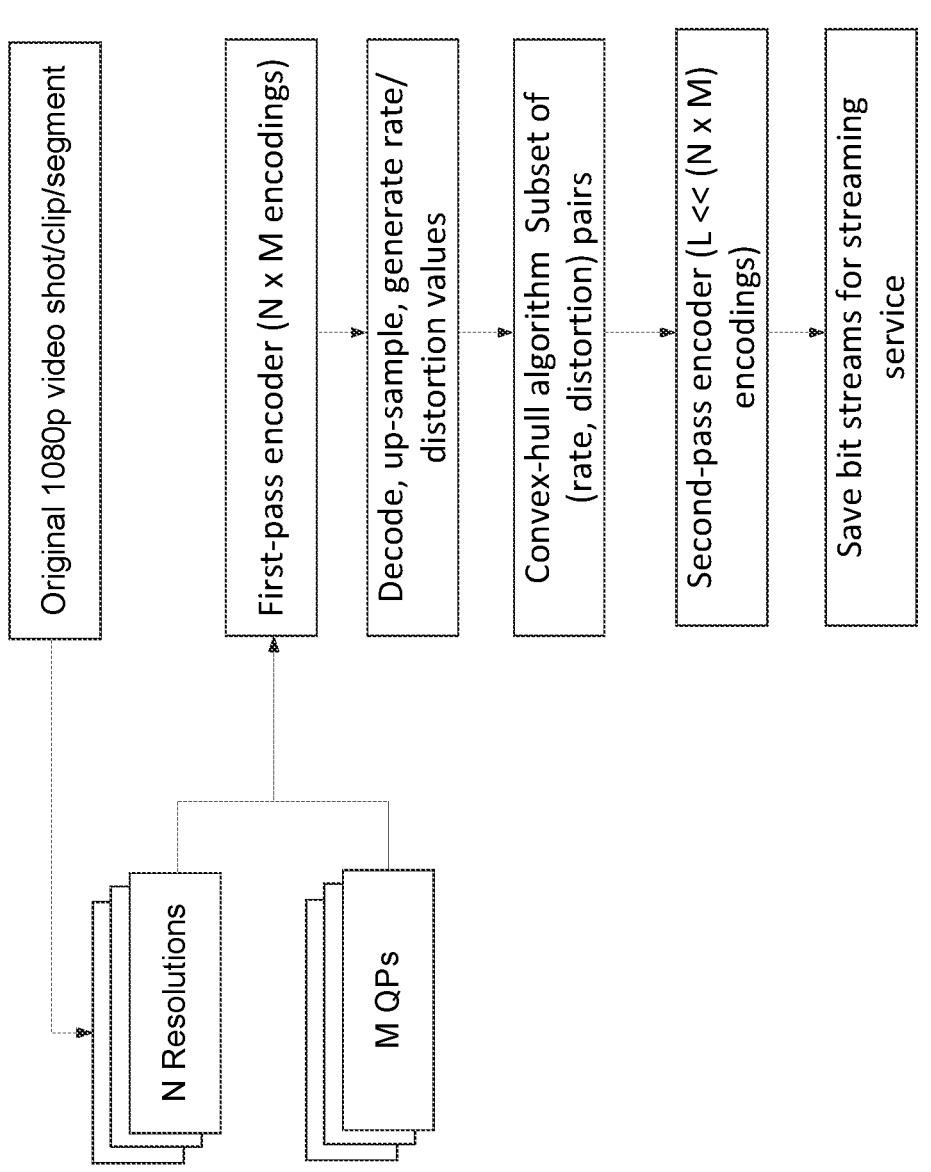
FIG. 2A-2B depict illustrative flow and chart for a 2-pass convex-hull-optimized encoder.
Figure 2B:
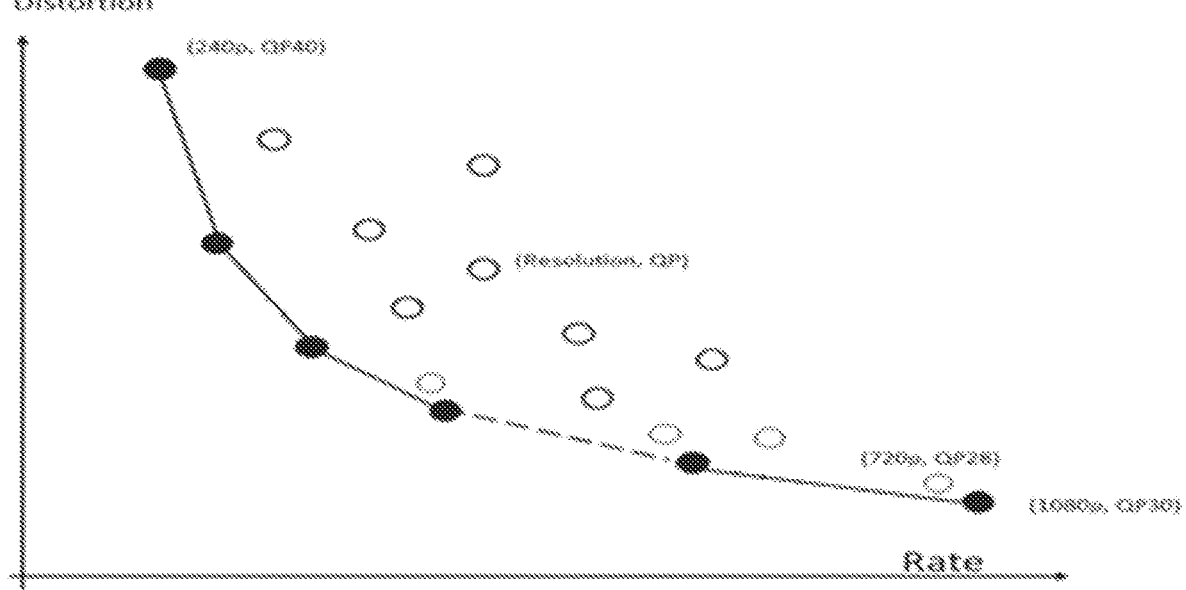

FIG. 2A-2B depict illustrative flow and chart for a 2-pass convex-hull-optimized encoder.

It should be understood that the 2-pass convex-hull-optimized encoder is one example used for illustration purposes only and that the complexity aware encoding system may be applied to other types of encoders (1-pass or multiple-pass encoders).

In the example of FIG. 2A, a video stream may be received from a source before being sent or downloaded by a client device. This video stream may be in the form of a video shot. The video shot may then be downsampled into multiple smaller resolutions (say N resolutions, where N is a positive integer) in order to provide encoding in these various resolutions before being delivered to the client's device. For example, for a video shot, there may be a 1080p version, a 720p version, or another version. Each of these specific-resolution videos is then encoded by an encoder at multiple constant rate factors (CRFs) (also referred to as QPs). For example, each of these specific-resolution videos may be encoded for M QP values, covering the full QP range, where M is a positive integer. Next, all encoded bit streams may be decoded, and all corresponding (rate, distortion) values are produced (N*M encodings/points). The distortion is a result value of a comparison between the original resolution (e.g., 1080p) of the video shot and an upsampled version (e.g., to bring it to 1080p) of the video shot that has been encoded in a lower resolution (e.g., a 720p). The (rate, distortion) values are then input to the CVH algorithm, which would keep only the pairs/points that yield good rate-distortion tradeoffs at the target rate levels. Therefore, a subset of the (rate, distortion) pairs would be used. A second-pass encoder may be used to re-encode the same video shot for only the CVH-selected (resolution, QP) pairs and produce the final bitstreams. These final bitstreams at various encodings would then be available for a client device to download. The selection of one encoding versus another depends on the network condition and the client device capability.

This algorithm is distortion-metric-agnostic, meaning one could use any metric, such as PSNR, SSIM, VMAF, or VMAF-NEG. All the (rate, distortion) values/points are then input into the convex hull algorithm (illustrated in FIG. 3), which would save/keep the points that yield the best rate-distortion tradeoffs at the target rate levels.

In FIG. 2B, (illustrating a simple example), it can be seen that the convex hull algorithm has selected the right-most 1080p point at QP=30 over the adjacent 720p point at QP=28. The main reason is that the 1080p point corresponds to better rate/distortion tradeoffs (through the computation of the slope value). But, since the encoding cycles of the 720p shot/clip at QP=28 would take as little as ½ the number of cycles required by the encoding of the 1080p version of the same video shot/clip at QP-30, selecting the (720p, QP28) would yield large savings in cycles with very little loss in quality.

Figure 3:
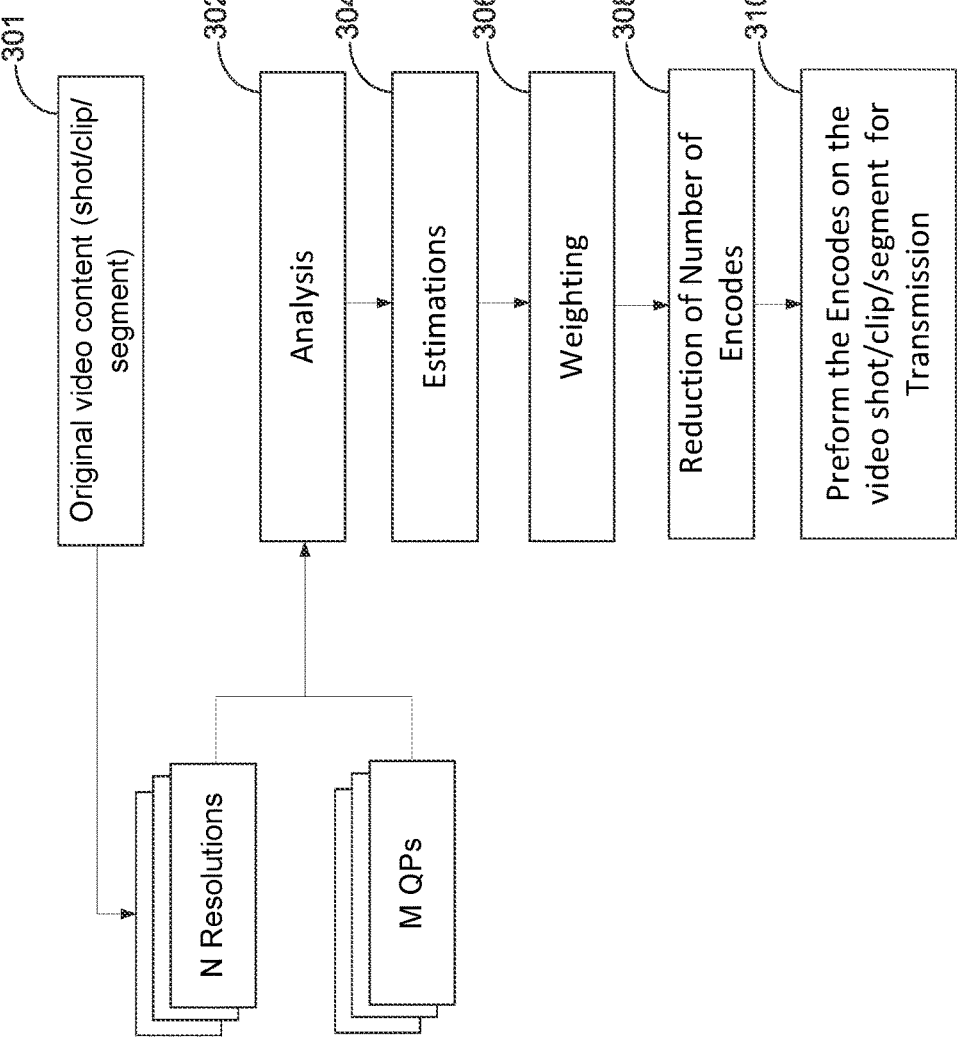
FIG. 3 depicts an illustrative schematic diagram for complexity aware encoding, in accordance with one or more example embodiments of the present disclosure.

FIG. 3 depicts an illustrative schematic diagram for an complexity aware encoding system, in accordance with one or more example embodiments of the present disclosure.

In one or more embodiments, a complexity aware encoding system may enhance the encoding of a video segment/shot in order to select (rate, distortion) points that would yield the best tradeoffs between rate/quality and encoding cycles.

When a user is interested in downloading a video, the user may have certain requirements for the resolution. The network condition may dictate the resolution selected for streaming.

In one or more embodiments, a complexity aware encoding system may be applicable to single or multiple-pass encoders. The 2-pass encoder is a more general example. It should be understood that this example would also apply to single or multiple pass encoding.

In one or more embodiments, using a 2-pass encoder as an example is used to save CPU cycles and reduce the wall time of the transcoding session. In this example, an analysis 302 is performed on video content 301. The result of the analysis 302 is to estimate 304 the bit rate and the distortion values from the original video content 301. During analysis 302, a first-pass encoder could be used for some or all the encodings of the video content 301, depending on the estimated number of cycles of the corresponding (resolution, QP) pair.

In one or more embodiments, a complexity aware encoding system may be cycles-cost-aware by weighting 306 the rate to include cycles or using a rate-distortion-cycles Lagrangian. But a simple solution for the weighting is to add distortion biases or offsets to the (rate, distortion) points with corresponding encodings that would take fewer CPU cycles. Following the weighting 306, a reduction 308 of the number of encodes is achieved based on the weighting 306. The reduction 308 of the number of encodes will reduce the number of encodes that will need to be performed during the encoding step of the original video content 301. The complexity aware encoding system may then perform 310 the encodes on the video content 301 for transmission. The reduced number of encoding that is needed will save processor cycle time.

As a simple example, it is discussed how to design some offsets/biases to weigh 306 the distortion based on the bit rate, QP values, or resolutions. The offsets could be applied to distortion metrics, or interchangeably to quality metrics. An underlying idea is that the offsets (quality-based, or distortion-based) would favor lower bit rates, higher QP encodings (while maintaining similar target rate/quality levels) and lower-resolution encodings. For ease of design, and without losing much in the resulting tradeoffs, the offsets (in the case of quality-based offsets) are designed to respect a tier-structure design. In other words, lower bit rates would not be allowed to have smaller offset values than those of higher bit rates, the higher QP values would not be allowed to have smaller offset values than those of lower QP values, and lower resolutions would not be allowed to have smaller offset values than those of higher resolutions.

A simple example of quality-based offset (positive: lower distortion; negative: higher distortion) values for 4 bit rate bands is given below. In Table 1 below, negative offset values of (−0.50) and (−0.25) are applied to bit rates falling in the ranges of [10 Mbps, infinity] and [5 Mbps, 10 Mbps], respectively. A positive offset value is applied to bit rates in the low bit rate range [0 Mbps, 1 Mbps], and no offset values are applied for all bit rates in the target range of [1 Mbps, 5 Mbps].

TABLE 1

| Bit Rate | >=10 Mbps | >=5 Mbps | 1-5 Mbps | <=1 Mbps |
|---|---|---|---|---|
| Offset | −0.50 | −0.25 | 0.00 | 0.50 |

A simple example of offset values for 4 QP values is given below. In Table 2 below, offset values are applied for all QP values that equal to, or higher than, 30. Note that the optimizations yielded the same offset value of 0.25 for both QP=30 and QP=40. However, a large offset of 0.50 for QP=50 is needed.

TABLE 2

| QP | 20 | 30 | 40 | 50 |
|---|---|---|---|---|
| Offset | 0 | 0.25 | 0.25 | 0.5 |

A simple example is provided for resolution-based offsets. Table 3 below includes non-zero offsets for all 720p+ resolutions, with increasing offsets to 0.5/0.75 for 540p/360p (respectively).

TABLE 3

| Resolutions | 1080 p | 720 p | 540 p | 360 p |
|---|---|---|---|---|
| Offset | 0 | 0.25 | 0.5 | 0.75 |

It is understood that the above descriptions are for purposes of illustration and are not meant to be limiting.

FIG. 4 illustrates a flow diagram of a process 400 for a complexity aware encoding system, in accordance with one or more example embodiments of the present disclosure.

At block 402, a device (e.g., the complexity aware encoding device of FIG. 1 and/or the complexity aware encoding device 519 of FIG. 5) may generate a list of encodes based on pairs of resolution and quantization parameters (QP) pairs associated with one or more video segments received from a source.

At block 404, the device may generate an estimated bit rate associated with the one or more video segments based on an analysis of the one or more video segments.

At block 406, the device may determine distortion values associated with the one or more video segments;

At block 408, the device may apply a weighting mechanism to the distortion values using the estimated bit rate.

At block 410, the device may select a subset of encodes based on the weighting mechanism; and At block 412, the device may perform the subset of encodes on the one or more video segments for transmission.

It is understood that the above descriptions are for purposes of illustration and are not meant to be limiting.

Figure 5:
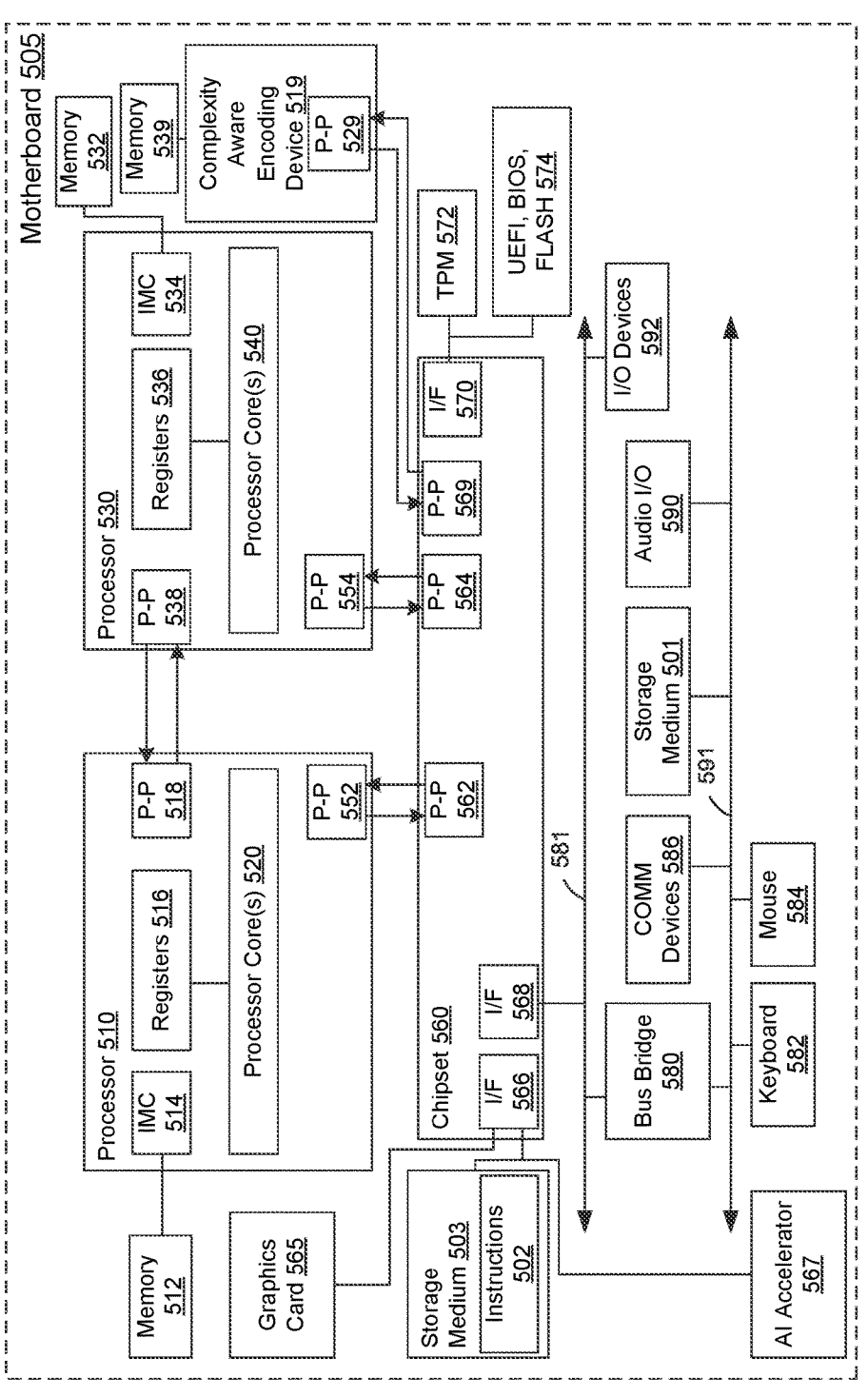
FIG. 5 is a block diagram illustrating an example of a computing device or computing system upon which any of one or more techniques (e.g., methods) may be performed, in accordance with one or more example embodiments of the present disclosure.

FIG. 5 illustrates an embodiment of an exemplary system 500, in accordance with one or more example embodiments of the present disclosure.

In various embodiments, the computing system 500 may comprise or be implemented as part of an electronic device.

In some embodiments, the computing system 500 may be representative, for example, of a computer system that implements one or more components of FIG. 1.

The embodiments are not limited in this context. More generally, the computing system 500 is configured to implement all logic, systems, processes, logic flows, methods, equations, apparatuses, and functionality described herein and with reference to FIGS. 1-6.

The system 500 may be a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, a handheld device such as a personal digital assistant (PDA), or other devices for processing, displaying, or transmitting information. Similar embodiments may comprise, e.g., entertainment devices such as a portable music player or a portable video player, a smart phone or other cellular phones, a telephone, a digital video camera, a digital still camera, an external storage device, or the like. Further embodiments implement larger scale server configurations. In other embodiments, the system 500 may have a single processor with one core or more than one processor. Note that the term "processor" refers to a processor with a single core or a processor package with multiple processor cores.

In at least one embodiment, the computing system 500 is representative of one or more components of FIG. 1. More generally, the computing system 500 is configured to implement all logic, systems, processes, logic flows, methods, apparatuses, and functionality described herein with reference to the above figures.

As used in this application, the terms "system" and "component" and "module" are intended to refer to a computer-related entity, either hardware, a combination of hardware and software, software, or software in execution, examples of which are provided by the exemplary system 500. For example, a component can be, but is not limited to being, a process running on a processor, a processor, a hard disk drive, multiple storage drives (of optical and/or magnetic storage medium), an object, an executable, a thread of execution, a program, and/or a computer.

By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 500 comprises a motherboard 505 for mounting platform components. The motherboard 505 is a point-to-point interconnect platform that includes a processor 510, a processor 530 coupled via a point-to-point interconnects as an Ultra Path Interconnect (UPI), and a complexity aware encoding device 519. In other embodiments, the system 500 may be of another bus architecture, such as a multi-drop bus. Furthermore, each of processors 510 and 530 may be processor packages with multiple processor cores. As an example, processors 510 and 530 are shown to include processor core(s) 520 and 540, respectively. While the system 500 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 510 and the chipset 560. Some platforms may include additional components and some platforms may only include sockets to mount the processors and/or the chipset.

The processors 510 and 530 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processors 510, and 530.

The processor 510 includes an integrated memory controller (IMC) 514, registers 516, and point-to-point (P-P) interfaces 518 and 552. Similarly, the processor 530 includes an IMC 534, registers 536, and P-P interfaces 538 and 554. The IMC's 514 and 534 couple the processors 510 and 530, respectively, to respective memories, a memory 512 and a memory 532. The memories 512 and 532 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 512 and 532 locally attach to the respective processors 510 and 530.

In addition to the processors 510 and 530, the system 500 may include a complexity aware encoding device 519. The complexity aware encoding device 519 may be connected to chipset 560 by means of P-P interfaces 529 and 569. The complexity aware encoding device 519 may also be connected to a memory 539. In some embodiments, the complexity aware encoding device 519 may be connected to at least one of the processors 510 and 530. In other embodiments, the memories 512, 532, and 539 may couple with the processor 510 and 530, and the complexity aware encoding device 519 via a bus and shared memory hub.

System 500 includes chipset 560 coupled to processors 510 and 530. Furthermore, chipset 560 can be coupled to storage medium 503, for example, via an interface (I/F) 566. The I/F 566 may be, for example, a Peripheral Component Interconnect-enhanced (PCI-e). The processors 510, 530, and the complexity aware encoding device 519 may access the storage medium 503 through chipset 560.

Storage medium 503 may comprise any non-transitory computer-readable storage medium or machine-readable storage medium, such as an optical, magnetic or semiconductor storage medium. In various embodiments, storage medium 503 may comprise an article of manufacture. In some embodiments, storage medium 503 may store computer-executable instructions, such as computer-executable instructions 502 to implement one or more of processes or operations described herein, (e.g., process 400 of FIG. 4). The storage medium 503 may store computer-executable instructions for any equations depicted above. The storage medium 503 may further store computer-executable instructions for models and/or networks described herein, such as a neural network or the like. Examples of a computer-readable storage medium or machine-readable storage medium may include any tangible media capable of storing electronic data, including volatile memory or non-volatile memory, removable or non-removable memory, erasable or non-erasable memory, writeable or re-writeable memory, and so forth. Examples of computer-executable instructions may include any suitable types of code, such as source code, compiled code, interpreted code, executable code, static code, dynamic code, object-oriented code, visual code, and the like. It should be understood that the embodiments are not limited in this context.

The processor 510 couples to a chipset 560 via P-P interfaces 552 and 562 and the processor 530 couples to a chipset 560 via P-P interfaces 554 and 564. Direct Media Interfaces (DMIs) may couple the P-P interfaces 552 and 562 and the P-P interfaces 554 and 564, respectively. The DMI may be a high-speed interconnect that facilitates, e.g., eight Giga Transfers per second (GT/s) such as DMI 3.0. In other embodiments, the processors 510 and 530 may interconnect via a bus.

The chipset 560 may comprise a controller hub such as a platform controller hub (PCH). The chipset 560 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 560 may comprise more than one controller hub such as a chipset with a memory controller hub, a graphics controller hub, and an input/output (I/O) controller hub.

In the present embodiment, the chipset 560 couples with a trusted platform module (TPM) 572 and the UEFI, BIOS, Flash component 574 via an interface (I/F) 570. The TPM 572 is a dedicated microcontroller designed to secure hardware by integrating cryptographic keys into devices. The UEFI, BIOS, Flash component 574 may provide pre-boot code.

Furthermore, chipset 560 includes the I/F 566 to couple chipset 560 with a high-performance graphics engine, graphics card 565. In other embodiments, the system 500 may include a flexible display interface (FDI) between the processors 510 and 530 and the chipset 560. The FDI interconnects a graphics processor core in a processor with the chipset 560.

Various I/O devices 592 couple to the bus 581, along with a bus bridge 580 which couples the bus 581 to a second bus 591 and an I/F 568 that connects the bus 581 with the chipset 560. In one embodiment, the second bus 591 may be a low pin count (LPC) bus. Various devices may couple to the second bus 591 including, for example, a keyboard 582, a mouse 584, communication devices 586, a storage medium 501, and an audio I/O 590.

The artificial intelligence (AI) accelerator 567 may be circuitry arranged to perform computations related to AI. The AI accelerator 567 may be connected to storage medium 503 and chipset 560. The AI accelerator 567 may deliver the processing power and energy efficiency needed to enable abundant-data computing. The AI accelerator 567 is a class of specialized hardware accelerators or computer systems designed to accelerate artificial intelligence and machine learning applications, including artificial neural networks and machine vision. The AI accelerator 567 may be applicable to algorithms for robotics, internet of things, other data-intensive and/or sensor-driven tasks.

Many of the I/O devices 592, communication devices 586, and the storage medium 501 may reside on the motherboard 505 while the keyboard 582 and the mouse 584 may be add-on peripherals. In other embodiments, some or all the I/O devices 592, communication devices 586, and the storage medium 501 are add-on peripherals and do not reside on the motherboard 505.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, yet still co-operate or interact with each other.

In addition, in the foregoing Detailed Description, various features are grouped together in a single example to streamline the disclosure. This method of disclosure is not to be interpreted as reflecting an intention that the claimed examples require more features than are expressly recited in each claim. Rather, as the following claims reflect, the inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chipset, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language, and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The following examples pertain to further embodiments.

Example 1 may include a device comprising processing circuitry coupled to storage, the processing circuitry configured to: generate a list of encodes based on pairs of resolution and quantization parameters (QP) pairs associated with one or more video segments received from a source; generate an estimated bit rate associated with the one or more video segments based on an analysis of the one or more video segments; determine distortion values associated with the one or more video segments; apply a weighting mechanism to the distortion values using the estimated bit rate; select a subset of encodes based on the weighting mechanism; and perform the subset of encodes on the one or more video segments for transmission.

Example 2 may include the device of example 1 and/or some other example herein, wherein the weighting mechanism applies offset values to the distortion values based on pre-determined criteria.

Example 3 may include the device of example 2 and/or some other example herein, wherein the pre-determined criteria may be based on at least one of bit rate, QP, and resolution.

Example 4 may include the device of example 1 and/or some other example herein, wherein the estimated bit rate increases with increased resolution of the one or more video segments for a same video complexity or QP.

Example 5 may include the device of example 1 and/or some other example herein, wherein the estimated bit rate increases with a decreased QP of the one or more video segments for a same video complexity or resolution.

Example 6 may include the device of example 1 and/or some other example herein, wherein the estimated bit rate increases with increased complexity of the one or more video segments for a same QP or resolution.

Example 7 may include the device of example 1 and/or some other example herein, wherein the analysis of the one or more video segments comprises the processing circuitry being further configured to: perform the encodes using a first pass encoder; and decode resulting bit streams to generate the estimated bit rates needed to decide final encodes before a second pass encoder.

Example 8 may include the device of example 1 and/or some other example herein, wherein to select the subset of encodes based on the weighting mechanism comprises the processing circuitry being further configured to apply a convex-hull algorithm to output pairs of the encodes.

Example 9 may include the device of example 1 and/or some other example herein, wherein the processing circuitry may be further configured to generate a bit stream of the encodes to be sent to a streaming service.

Example 10 may include a non-transitory computer-readable medium storing computer-executable instructions which when executed by one or more processors result in performing operations comprising: generating a list of encodes based on pairs of resolution and quantization parameters (QP) pairs associated with one or more video segments received from a source; generating an estimated bit rate associated with the one or more video segments based on an analysis of the one or more video segments; determining distortion values associated with the one or more video segments; applying a weighting mechanism to the distortion values using the estimated bit rate; selecting a subset of encodes based on the weighting mechanism; and performing the subset of encodes on the one or more video segments for transmission.

Example 11 may include the non-transitory computer-readable medium of example 10 and/or some other example herein, wherein the weighting mechanism applies offset values to the distortion values based on pre-determined criteria.

Example 12 may include the non-transitory computer-readable medium of example 11 and/or some other example herein, wherein the pre-determined criteria may be based on at least one of bit rate, QP, and resolution.

Example 13 may include the non-transitory computer-readable medium of example 10 and/or some other example herein, wherein the estimated bit rate increases with increased resolution of the one or more video segments for a same video complexity or QP.

Example 14 may include the non-transitory computer-readable medium of example 10 and/or some other example herein, wherein the estimated bit rate increases with a decreased QP of the one or more video segments for a same video complexity or resolution.

Example 15 may include the non-transitory computer-readable medium of example 10 and/or some other example herein, wherein the estimated bit rate increases with increased complexity of the one or more video segments for a same QP or resolution.

Example 16 may include the non-transitory computer-readable medium of example 10 and/or some other example herein, wherein the operations further comprise: performing the encodes using a first pass encoder; and decoding resulting bit streams to generate the estimated bit rates needed to decide final encodes before a second pass encoder.

Example 17 may include the non-transitory computer-readable medium of example 10 and/or some other example herein, wherein the operations further comprise applying a convex-hull algorithm to output pairs of the encodes.

Example 18 may include the non-transitory computer-readable medium of example 10 and/or some other example herein, wherein the operations further comprise generating a bit stream of the encodes to be sent to a streaming service.

Example 19 may include a method comprising: generating, by one or more processors, a list of encodes based on pairs of resolution and quantization parameters (QP) pairs associated with one or more video segments received from a source; generating an estimated bit rate associated with the one or more video segments based on an analysis of the one or more video segments; determining distortion values associated with the one or more video segments; applying a weighting mechanism to the distortion values using the estimated bit rate; selecting a subset of encodes based on the weighting mechanism; and performing the subset of encodes on the one or more video segments for transmission.

Example 20 may include the method of example 19 and/or some other example herein, wherein the weighting mechanism applies offset values to the distortion values based on pre-determined criteria.

Example 21 may include the method of example 20 and/or some other example herein, wherein the pre-determined criteria may be based on at least one of bit rate, QP, and resolution.

Example 22 may include the method of example 19 and/or some other example herein, wherein the estimated bit rate increases with increased resolution of the one or more video segments for a same video complexity or QP.

Example 23 may include the method of example 19 and/or some other example herein, wherein the estimated bit rate increases with a decreased QP of the one or more video segments for a same video complexity or resolution.

Example 24 may include the method of example 19 and/or some other example herein, wherein the estimated bit rate increases with increased complexity of the one or more video segments for a same QP or resolution.

Example 25 may include the method of example 19 and/or some other example herein, further comprising: performing the encodes using a first pass encoder; and decoding resulting bit streams to generate the estimated bit rates needed to decide final encodes before a second pass encoder.

Example 26 may include the method of example 19 and/or some other example herein, further comprising applying a convex-hull algorithm to output pairs of the encodes.

Example 27 may include the method of example 19 and/or some other example herein, further comprising generating a bit stream of the encodes to be sent to a streaming service.

Example 28 may include an apparatus comprising means for: generating a list of encodes based on pairs of resolution and quantization parameters (QP) pairs associated with one or more video segments received from a source; generating an estimated bit rate associated with the one or more video segments based on an analysis of the one or more video segments; determining distortion values associated with the one or more video segments; applying a weighting mechanism to the distortion values using the estimated bit rate; selecting a subset of encodes based on the weighting mechanism; and performing the subset of encodes on the one or more video segments for transmission.

Example 29 may include the apparatus of example 28 and/or some other example herein, wherein the weighting mechanism applies offset values to the distortion values based on pre-determined criteria.

Example 30 may include the apparatus of example 29 and/or some other example herein, wherein the pre-determined criteria may be based on at least one of bit rate, QP, and resolution.

Example 31 may include the apparatus of example 28 and/or some other example herein, wherein the estimated bit rate increases with increased resolution of the one or more video segments for a same video complexity or QP.

Example 32 may include the apparatus of example 28 and/or some other example herein, wherein the estimated bit rate increases with a decreased QP of the one or more video segments for a same video complexity or resolution.

Example 33 may include the apparatus of example 28 and/or some other example herein, wherein the estimated bit rate increases with increased complexity of the one or more video segments for a same QP or resolution.

Example 34 may include the apparatus of example 28 and/or some other example herein, further comprising means for: performing the encodes using a first pass encoder; and decoding resulting bit streams to generate the estimated bit rates needed to decide final encodes before a second pass encoder.

Example 35 may include the apparatus of example 28 and/or some other example herein, further comprising means for applying a convex-hull algorithm to output pairs of the encodes.

Example 36 may include the apparatus of example 28 and/or some other example herein, further comprising means for generating a bit stream of the encodes to be sent to a streaming service.

Example 37 may include one or more non-transitory computer-readable media comprising instructions to cause an electronic device, upon execution of the instructions by one or more processors of the electronic device, to perform one or more elements of a method described in or related to any of examples 1-36, or any other method or process described herein.

Example 38 may include an apparatus comprising logic, modules, and/or circuitry to perform one or more elements of a method described in or related to any of examples 1-36, or any other method or process described herein.

Example 39 may include a method, technique, or process as described in or related to any of examples 1-36, or portions or parts thereof.

Example 40 may include an apparatus comprising: one or more processors and one or more computer readable media comprising instructions that, when executed by the one or more processors, cause the one or more processors to perform the method, techniques, or process as described in or related to any of examples 1-36, or portions thereof.

Example 41 may include a method of communicating in a wireless network as shown and described herein.

Example 42 may include a system for providing wireless communication as shown and described herein.

Example 43 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
    generate a list of encodes based on pairs of resolution and quantization parameters (QP) pairs associated with one or more video segments received from a source;
    generate an estimated bit rate associated with the one or more video segments based on an analysis of the one or more video segments;
    determine distortion values associated with the one or more video segments;
    apply a weighting mechanism to the distortion values using the estimated bit rate;
    select a subset of encodes based on the weighting mechanism; and
    perform the subset of encodes on the one or more video segments for transmission.

2. The device of claim 1, wherein the weighting mechanism applies offset values to the distortion values based on pre-determined criteria.

3. The device of claim 2, wherein the pre-determined criteria is based on at least one of bit rate, QP, and resolution.

4. The device of claim 1, wherein the estimated bit rate increases with increased resolution of the one or more video segments for a same video complexity or QP.

5. The device of claim 1, wherein the estimated bit rate increases with a decreased QP of the one or more video segments for a same video complexity or resolution.

6. The device of claim 1, wherein the estimated bit rate increases with increased complexity of the one or more video segments for a same QP or resolution.

7. The device of claim 1, wherein the analysis of the one or more video segments comprises the processing circuitry being further configured to:
    perform the encodes using a first pass encoder; and
    decode resulting bit streams to generate the estimated bit rates needed to decide final encodes before a second pass encoder.

8. The device of claim 1, wherein to select the subset of encodes based on the weighting mechanism comprises the processing circuitry being further configured to apply a convex-hull algorithm to output pairs of the encodes.

9. The device of claim 1, wherein the processing circuitry is further configured to generate a bit stream of the encodes to be sent to a streaming service.

10. A non-transitory computer-readable medium storing computer-executable instructions which when executed by one or more processors result in performing operations comprising:
    generating a list of encodes based on pairs of resolution and quantization parameters (QP) pairs associated with one or more video segments received from a source;
    generating an estimated bit rate associated with the one or more video segments based on an analysis of the one or more video segments;
    determining distortion values associated with the one or more video segments;
    applying a weighting mechanism to the distortion values using the estimated bit rate;
    selecting a subset of encodes based on the weighting mechanism; and
    performing the subset of encodes on the one or more video segments for transmission.

11. The non-transitory computer-readable medium of claim 10, wherein the weighting mechanism applies offset values to the distortion values based on pre-determined criteria.

12. The non-transitory computer-readable medium of claim 11, wherein the pre-determined criteria is based on at least one of bit rate, QP, and resolution.

13. The non-transitory computer-readable medium of claim 10, wherein the estimated bit rate increases with increased resolution of the one or more video segments for a same video complexity or QP.

14. The non-transitory computer-readable medium of claim 10, wherein the estimated bit rate increases with a decreased QP of the one or more video segments for a same video complexity or resolution.

15. The non-transitory computer-readable medium of claim 10, wherein the estimated bit rate increases with increased complexity of the one or more video segments for a same QP or resolution.

16. The non-transitory computer-readable medium of claim 10, wherein the operations further comprise:
    performing the encodes using a first pass encoder; and decoding resulting bit streams to generate the estimated bit rates needed to decide final encodes before a second pass encoder.

17. The non-transitory computer-readable medium of claim 10, wherein the operations further comprise applying a convex-hull algorithm to output pairs of the encodes.

18. The non-transitory computer-readable medium of claim 10, wherein the operations further comprise generating a bit stream of the encodes to be sent to a streaming service.

19. A method comprising:

generating, by one or more processors, a list of encodes based on pairs of resolution and quantization parameters (QP) pairs associated with one or more video segments received from a source;

generating an estimated bit rate associated with the one or more video segments based on an analysis of the one or more video segments;

determining distortion values associated with the one or more video segments;

applying a weighting mechanism to the distortion values using the estimated bit rate;

selecting a subset of encodes based on the weighting mechanism; and performing the subset of encodes on the one or more video segments for transmission.

20. The method of claim 19, wherein the weighting mechanism applies offset values to the distortion values based on pre-determined criteria.

\* \* \* \* \*